United States Patent [19]

Weitzman

[11] Patent Number: 5,200,033
[45] Date of Patent: Apr. 6, 1993

[54] METHOD FOR REMOVING ORGANIC CONTAMINANTS FROM SOILS

[75] Inventor: Leo Weitzman, West Lafayette, Ind.

[73] Assignee: LWV Associates, Inc., W. Lafayette, Ind.

[21] Appl. No.: 757,057

[22] Filed: Sep. 9, 1991

[51] Int. Cl.⁵ .............................. B01D 1/14
[52] U.S. Cl. .................... 159/47.1; 159/16.1; 159/16.3; 159/23; 159/29; 159/47.3; 159/DIG. 20; 47/1.42; 47/DIG. 10; 202/83; 202/175; 202/233; 203/49; 203/95
[58] Field of Search ............. 159/47.3, 47.1, 905, 159/16.3, 16.1, 23, 29, DIG. 20, DIG. 21; 202/175, 83, 234, 233, 235; 47/1.42, DIG. 10; 203/49, 95

[56] References Cited

U.S. PATENT DOCUMENTS

| | | | |
|---|---|---|---|
| 3,169,537 | 2/1965 | Fuhring | 202/175 |
| 3,617,225 | 11/1971 | Kuehne et al. | 159/25.1 |
| 3,672,958 | 6/1972 | McCandlish | 202/170 |
| 3,678,596 | 7/1972 | Kubo | 159/25.1 |
| 3,956,060 | 5/1976 | Scoggin | 159/16.3 |
| 3,997,406 | 12/1976 | Arvanitakis | 202/175 |
| 4,003,717 | 1/1977 | Cass et al. | 159/25.1 |
| 4,038,184 | 7/1977 | Svanteson | 159/25.1 |
| 4,180,455 | 12/1979 | Taciuk . | |
| 4,279,704 | 7/1981 | Noble et al. | 202/175 |
| 4,280,879 | 7/1981 | Taciuk . | |
| 4,306,961 | 12/1981 | Taciuk . | |
| 4,463,691 | 8/1984 | Meenan et al. . | |
| 4,685,220 | 8/1987 | Meenan et al. . | |
| 4,699,721 | 10/1987 | Meenan et al. . | |
| 4,738,206 | 4/1988 | Noland . | |
| 4,778,606 | 10/1988 | Meenan et al. . | |
| 4,782,625 | 11/1988 | Gerken et al. . | |
| 4,818,297 | 4/1989 | Holzmuller et al. | 202/175 |
| 4,864,942 | 9/1989 | Fochtman et al. . | |
| 4,872,949 | 10/1989 | Wilwerding | 203/DIG. 8 |
| 4,951,417 | 8/1990 | Gerken et al. . | |

OTHER PUBLICATIONS

"Thermal Treatment for the Removal of PCBs and other Organic from Soils"; Robert D. Fox, Edward S. Alperin & Hubert H. Huls; Environmental Progress—Feb. 1991.

"Thermal Desorption Attainable Remediation Levels"; Paul R. dePercin; Apr. 1991 p. 511.

"Volatile Emissions from Stabilized Wastes"; Leo Weitzman; EPA/600/9-90/006 Feb. 1990 p. 448.

Primary Examiner—Wilbur Bascomb, Jr.
Attorney, Agent, or Firm—Woodard, Emhardt, Naughton, Moriarty & McNett

[57] ABSTRACT

A method and device for removing organic compounds from soil, solids, sludges and other types of contaminated materials utilizing a non-rotating contactor which can be tightly sealed from air infiltration. Binders such as cement, lime, flyash or kiln dust may be added to the soil prior to treatment so as to aid in the volatilization of the volatile organics and to immobilize the non-volatile constituents in the treated solids. The contaminated materials are fed to a chamber with a movable rake therein and are subjected to temperatures sufficiently high to violatize the organic constituents. The volatilized contaminants are purged with small amounts of air or other non-condensible gas and with superheated steam. The organic constituents can be captured in a vapor phase or they can be condensed and captured in the condensed liquid.

5 Claims, 4 Drawing Sheets

METHOD FOR REMOVING ORGANIC CONTAMINANTS FROM SOILS

FIELD OF THE INVENTION

The present invention is directed to a method for improving the efficiency and cost of construction and operation of indirect heating systems used to treat solids, sludges and soils containing organic contaminants and, if desired, to stabilize or immobilize the remaining inorganic and non-volatile organic contaminants. More specifically, the invention concerns a process and apparatus for mixing the solids with binders (if these are needed) such as, but not limited to, portland cement, flyash, lime kiln dust, cement kiln dust, lime, or quicklime, and then heating the soil in an efficient manner to drive off the organic contaminants from the non-volatile materials. The process allows the use of superheated steam as a major component of the purge gases needed to facilitate removal of the volatile contaminants and aid in the solidification/stabilization process. The treated solids, consisting of the non-volatile components of the original mixture is then allowed to harden and cure. The resulting product will have had all volatile and semi-volatile organics removed by the thermal treatment and the metals and non-volatile contaminants will have been immobilized by the binder used to stabilize the material.

BACKGROUND OF THE INVENTION

The Hazardous and Solid Waste Amendments (HSWA) to the Resource Conservation and Recovery Act (RCRA), United States Public Law P.L. 98-616 include specific provisions restricting the direct land disposal of many hazardous wastes, including contaminated soils. These restrictions, commonly termed the "Land Ban" require that many types of waste be treated to reduce the toxicity or mobility of the hazardous components. Similar provisions have been incorporated into regulations under the Comprehensive Environmental Response, Compensation and Liability Act (CERCLA) of 1980 which is commonly referred to as "Superfund" and in the Superfund Amendment and Reauthorization Act of 1986 Regulations written by the United States Environmental Protection Agency (EPA) under both acts specify methods for treating a variety of wastes prior to land disposal.

The methods specified for wastes containing organic contaminants is incineration or thermal treatment. The specified method for wastes containing metals is solidification/stabilization. Wastes containing both organics and metals, such as from the production or use of metalo-organic compounds, are difficult to incinerate. The temperatures encountered in incineration volatilize the metals and their compounds resulting in the formation of metal fumes which are very fine and which require very complex and energy intensive air pollution control equipment.

An alternative method of treating contaminated solids, especially contaminated soils is indirect thermal treatment. It is proving to be the thermal treatment method of choice for many applications. Indirect thermal treatment is differentiated from incineration by two features. First, the temperatures tend to be lower (on the order of 85° to 385° C. rather than typically 535° C. and up for incineration) and second, the waste is not directly exposed to the flame so that the contaminants released from the material being treated are not mixed with the combustion gases from the flame. Separating the waste from the combustion gases reduces the volume of contaminated gases that need to be cleaned and reduces the likelihood of formation of undesirable products of combustion such as chlordibenzodioxins and chlorodibenzofurans.

Indirect thermal treatment systems presently in use overcome many of the problems encountered when attempting to incinerate contaminated solids such as soils but they are based on equipment much like that used for incinerators. Examples of such equipment include the rotary kilns disclosed in the U.S. Pat. No. 4,864,942 issued to Fochtman et. al. and in the U.S. Pat. Nos. 4,782,625 and 4,951,417 issued to Gerkin et. al., the fluidized beds disclosed in U.S. Pat. Nos. 4,778,606, 4,685,220, 4,463,691, and 4,699,721 issued to Meenan et. al., and the pyrolitic chambers disclosed in U.S. Pat. Nos. 4,306,961, 4,180,455, and 4,280,879 issued to Taciuk. Noland recognizes in U.S. Pat. No. 4,738,206 the inherent problems in the use of incinerator-style hardware but his system utilizes an archimedes screw device for heating and conveying soils through the thermal desorber. Many disadvantages exist with such equipment. Screw devices are very complex and prone to jamming on large or sticky materials. Kilns and fluidized bed systems require relatively large amounts of gas. The rotary kilns are difficult to seal tightly and to prevent undesired air infiltration and fluidized bed systems require substantial amounts of gas to fluidize the solids. Fluidized beds cannot treat rocks, debris and other materials which cannot be fluidized. Because of these limitations, present systems produce significant amounts of particulate which is usually hazardous and which requires large and highly efficient air pollution control devices.

Indirect heating is a relatively inefficient method of transferring heat to a solid. Typically, the heat is transferred by contact between the solid and the walls of the vessel containing the solid and by blowing a hot, inert gas (termed herein as "purge gas") over the solids. With the exception of the system disclosed by Noland, the heat transfer occurs in a kiln, a device with a relatively small heat transfer area. The problem is typically overcome by also passing hot gases through the system to improve the heat transfer efficiency. Gases that have been used are nitrogen, air, and combustion gases from the indirect heater.

In the paper by Fox, R. D., Alsperin, E. S., & Huls, H. H. "Thermal Treatment for the Removal of PCBs and Other Organics from Soil" Environmental Progress (Vol. 10, No1) February, 1991, P.40, thermal separation is discussed through the use of indirect heating of the contaminated material in a rotating metal chamber. The contaminants are separated by volatilization with the contaminants then being collected through the use of condensation techniques.

In the paper by dePercin, Paul, "Thermal Desorption Attainable Remediation Levels" Remedial Action Treatment and Disposal of Hazardous Waste, Proceedings of the Seventeenth Annual RREL Hazardous Waste Research Symposium, Environmental Protection Agency, EPA/600/9-91/002, April 1991 P.511 (Available from the Risk Reduction Engineering Laboratory, EPA, Cincinnati, Ohio) there is discussed one system (Described in Taciuk's patents) which does not use heated gas. Rather, the soil is simply heated to a temperature on the order of 535° C. and the organics are allowed to pyrolyze. This is a very high temperature approaching that of incineration. Such a high temperature is necessary because the process does not use a purge gas. Systems which utilize purge gases can operate at lower temperatures than those that do not because the inert purge gases sweep the organics away from the solids as they are desorbed.

The purge gas is, therefore a critical element of a low temperature desorption system but it results in significant volumes of gas that must be treated prior to discharge. All processes in operation at present utilize a non-condensible gas for purging. Gases used are: air, nitrogen, carbon dioxide, or vent gas from the auxiliary combustor. The non-condensible gases have the following two major disadvantages:

1. The condensible gases (water, contaminants) removed from the contaminated solids are diluted by the non-condensible purge gas reducing the condensers' efficiency to remove the organics. As a result, thermal treatment systems must use refrigerated condensers, and relatively large adsorbers to capture the contaminants released from the solids.

2. The desorption process releases relatively large amounts of contaminated particulate matter. As a result, the off-gas stream must be treated to control it. The use of condensible purge gases reduce the amount of gas requiring treatment; hence, the size and cost of the requisite air pollution control devices is decreased.

Thermal desorption systems currently in use cannot use condensible purge gases because it is virtually impossible to exclude air from rotating systems that have substantial gas flows inside them. The present invention utilizes a specially designed non-rotating contactor with very few penetrations, which are small and can be readily sealed, to essentially eliminate air infiltration or releases of contaminated vapors and to thus make it possible to use superheated steam as a purge gas.

Finally, present thermal desorption systems cannot stabilize materials such as soils contaminated with metals. It is necessary to treat residues containing metals with binders in a second piece of apparatus in order to stabilize the product and reduce the leachability of metals present. Stabilization/solidification is the process whereby contaminated materials are mixed with a binder such as portland cement, lime, lime-kiln flyash, quicklime, cement kiln flyash, coal flyash or other, similar, materials either individually or in combination. Sometimes additives such as soluble silicates or iron compounds are added to change the process's characteristics. The resulting product typically sets up into a monolithic or granular material. The contaminants are bound and made less mobile by the process. Solidification/stabilization (S/S) is a well established treatment technology which has been used for many years to improve the handling and physical characteristics of soils and sludges and to reduce the mobility of toxic and carcinogenic metals. The technology does not work as well when the wastes being stabilized contain organics. Organics can reduce the strength and increase the leachability of the treated material and, as shown by Weitzman the act of stabilizing/solidifying vaporizes a substantial fraction of the volatile and semi-volatile organics contaminants.

Typically, substantial amounts of heat are generated during the mixing and solidification of the contaminated materials and binders. In fact, temperatures of 100° C. and greater can occur. In the paper by Weitzman, Leo "Volatile Emissions From Stabilized Wastes" Proceedings of the Fifteenth Annual RREL Hazardous Waste Research Symposium, Environmental Protection Agency, EPA/600/9-90/006, February, 1990 P.448. (Available from the Risk Reduction Engineering Laboratory, EPA, Cincinnati, Ohio), there is described the release of up to 70% of organic contaminants during the mixing of binder and contaminated soils. Such release of organics is undesirable when the mixing occurs in the open, as is common. The present invention takes advantage of the phenomenon. By mixing the binder prior to thermal desorption, the heats of reaction of the solidification/stabilization process are utilized to reduce the fuel requirement for the desorption system.

The present invention takes advantage of the tendency for the solidification/stabilization process to volatilize organics from solids and to enhance the process by combining it with thermal treatment. My invention:

1. Simplifies the soil heating system while improving the system's heat transfer characteristics.

2. Allows the system to be readily sealed against air infiltration so that it can be operated with a variety of sweep gases, including, superheated steam. This feature minimizes the volume of the gas streams that need to be moved and allows the design to be highly compact for ease of transport. This feature also minimizes fine particulate (fume) formation which, combined with the very low volumes of gas that need to be treated makes the technology especially suitable for removing organic contaminants from solids contaminated with toxic metals such as arsenic, and lead.

3. Allows the system to be operated at any combination of temperature and sweep gas flow rates to optimize performance on different types of contaminated materials.

4. Allows the use of a condensible gas, superheated steam as the sweep gas for the system. Since non-condensible gases significantly impair the ability of condensers to remove organic constituents, this improves the efficiency of condensers and makes them a viable pollution control device for a thermal desorption system. Adsorbers are required to treat a much lower volume gas stream consisting of the small amount of remaining non-condensible gas.

5. Allows the contaminants removed from the soil to be concentrated in an aqueous phase or a gas phase, depending on the nature of the contaminant and how it can best be destroyed subsequent to removal from the solids.

6. Allows the system to be very compact so that complete modules of commercially viable units can be mounted directly on one or a few over-the-road vehicles or trailers and still remain within the U.S. Department of Transportation size limitations. Setup at the site require connecting a relatively few ducts, hoses and power lines with little or no field assembly required. This feature reduces the cost of transport, set-up and knockdown at a contaminated site.

7. Allows a high heat transfer area per unit area occupied. A compact system can, therefore have a very high solids retention time, since for a given soil, contaminant removal increases with higher temperature and with longer residence time. The compact design allows the use of lower temperatures for improved energy efficiency and a reduced likelihood of vaporizing substances such as toxic metal salts.

8. Takes advantage of the heat released by many types of binders when mixed with soil, sludge, dredging material and other types of solids to help remove the organics from the soil.

SUMMARY OF THE INVENTION

One embodiment of the present invention is a device for removing volatile and semi-volatile organics from contaminated material including soils, solids and sludges including a main housing having walls forming a stationary sealed chamber with the housing having an inlet to receive contaminated material and an outlet for the treated material. An agitator is movably mounted to the main housing and operable to agitate the contaminated material within the chamber and move same from the inlet to the outlet. A heater associated with the walls of the housing is operable to heat the walls and indirectly heat via the walls the contaminated material within the chamber and vaporize organics contained in the contaminated material. A gas input device is in fluid communication with the housing and is operable to direct heated gas into the contaminated material within the chamber and carry volatile contaminants vaporized from the heating of the contaminated material to external of the housing. A gas disposal receives the vapors from the gas input device and is operable to condense and collect components of the vapors.

Another embodiment of the present invention is a method of removing organics from contaminated material including soils, solids and sludges including the step of directing the contaminated material into a housing having walls forming a sealed chamber with a front portion with an inlet and a rear portion with an outlet and a longitudinal axis extending therebetween. The contaminated materials within the chamber are agitated with a movable agitator while the chamber is held stationary. The contaminated material is moved from the inlet to the outlet while the heated walls indirectly heat the contaminated material within the chamber to vaporize organics contained in the contaminated material. Gas is directed into the chamber to carry out of the chamber contaminants vaporized from heating of the contaminated material during the heating step.

The related objects and advantages of the present invention will be apparent from the following description.

DESCRIPTION OF THE PREFERRED EMBODIMENTS

Figure 1:
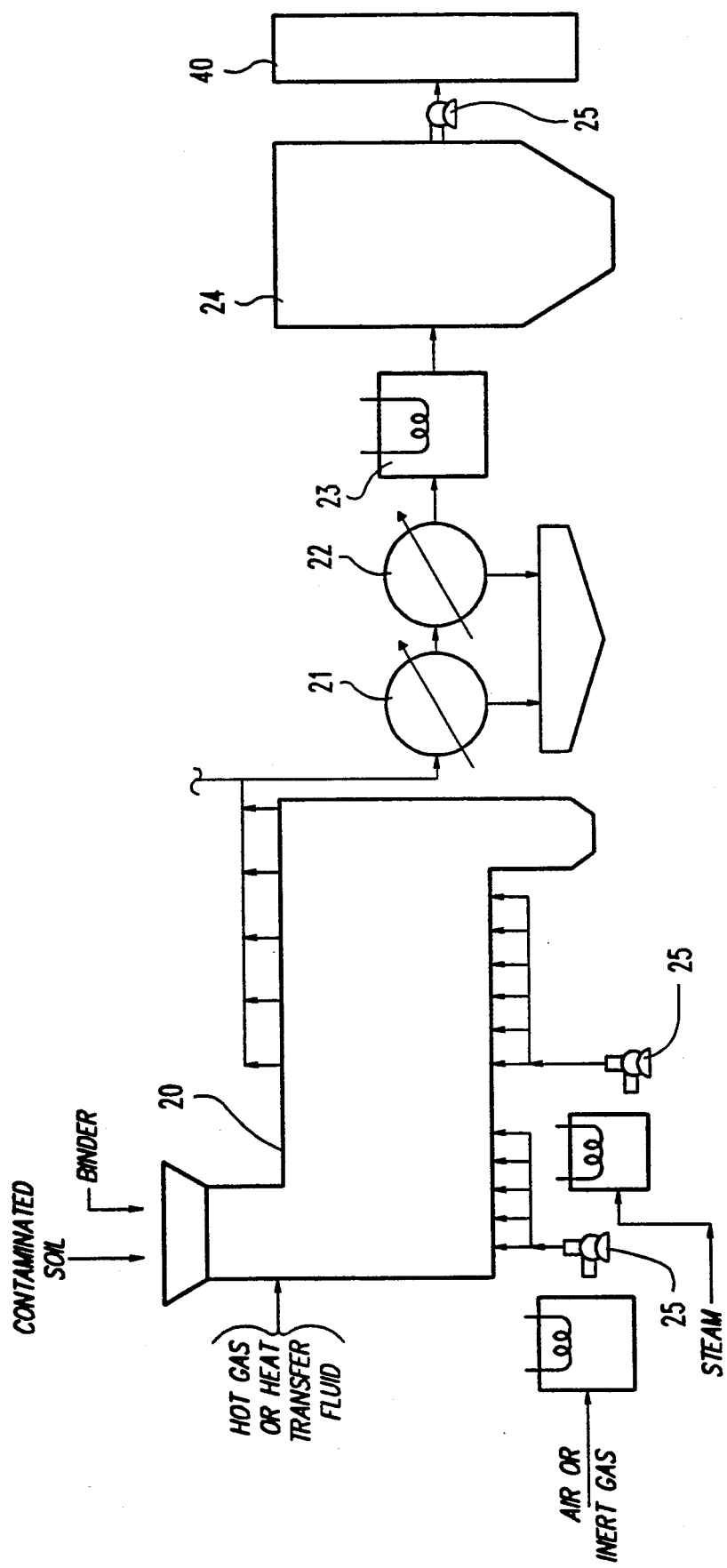
FIG. 1 is a block diagram of the system incorporating my invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 is a block diagram of the overall system. The invention consists of a stationary "thermal desorption chamber" 20 (termed the "treatment chamber" or simply the "chamber") followed by condensers and a variety of air pollution control equipment as follows:

(1) The primary condenser 21 connected to the purge gas outlet manifold 66 (FIG. 2) to condense the bulk of the contaminants and water vapor.

(2) A chilled water condenser 22 connected to the outlet of condenser 21 to drop the temperature of the remaining gases to approximately 10°-60° C. and remove additional water and contaminants.

(3) A reheater 23 connected to the outlet of condenser 22 to raise the temperature of the remaining gas above its dew point to prevent caking in downstream equipment.

(4) A particulate collection device 24 connected to the outlet of reheater 23. Device 24 may be an electrostatic precipitator, scrubber, fabric filter or other type of device. A dry, high efficiency device such as a fabric filter is preferred.

(5) One or more blowers 25, fans or other type of gas moving devices to remove the gases from the chamber and force them through the air pollution system may be desirable. The gas moving device may be located at different points in the system than shown herein.

(6) An organic vapor collection device 40 connected to the outlet of device 24 and may include an adsorber, absorber or thermal oxidizer. A dry, non-combustion device such as an adsorber utilizing activated carbon or another type of adsorbent material is preferred.

(6) A wastewater treatment system to purify the condensate may be included in the system. Alternatively, the condensate may be discharged to a sewer, wastewater treatment plant or it may be shipped off-site for disposal. The manner of treatment of the wastewater is subject to considerations of the types of contaminants, their concentration and of requirements for their treatment, discharge or disposal.

(7) External heaters may be provided to superheat the steam and to heat the non-condensible purge gases. This is desirable but can be eliminated by incorporating sufficient heating capacity in the thermal desorption chamber to heat these gases along with the solids.

The thermal contactor, consists of a chamber whose walls can be heated by electric heaters, or by pumping hot heat transfer fluid through tubes or an annular space around the chamber's walls or by combustion gases forced through the tubes or annular space. The contaminated solids and, if desired, binders, are fed through one or more feeders at one end of the chamber. If desired, the binder and solids can be premixed in a pugmill or other, similar device prior to charging into the chamber although this practice may require proper venting and control of organic vapors released during mixing. Typical binders which are solidification/stabilization agents include but are limited to the following: portland cement, other pozzolanic materials, flyash, cement kiln dust, lime kiln dust, lime, quicklime, calcium hydroxide, calcium oxide, compounds of magnesium, sodium hydroxide, and modifiers such as soluble silicates. The binders may be fed separately into the chamber or premixed with the contaminated soil.

The solids are agitated and moved through the chamber by steam jets, air jets, by mechanical rakes, ploughs or arms or by a combination of these. The solids' residence time will be determined by its characteristics and by the degree of contaminant removal required. The residence time can be adjusted by changing the pitch of the chamber or by changing the shape or speed of the mechanical agitators.

Figure 2:
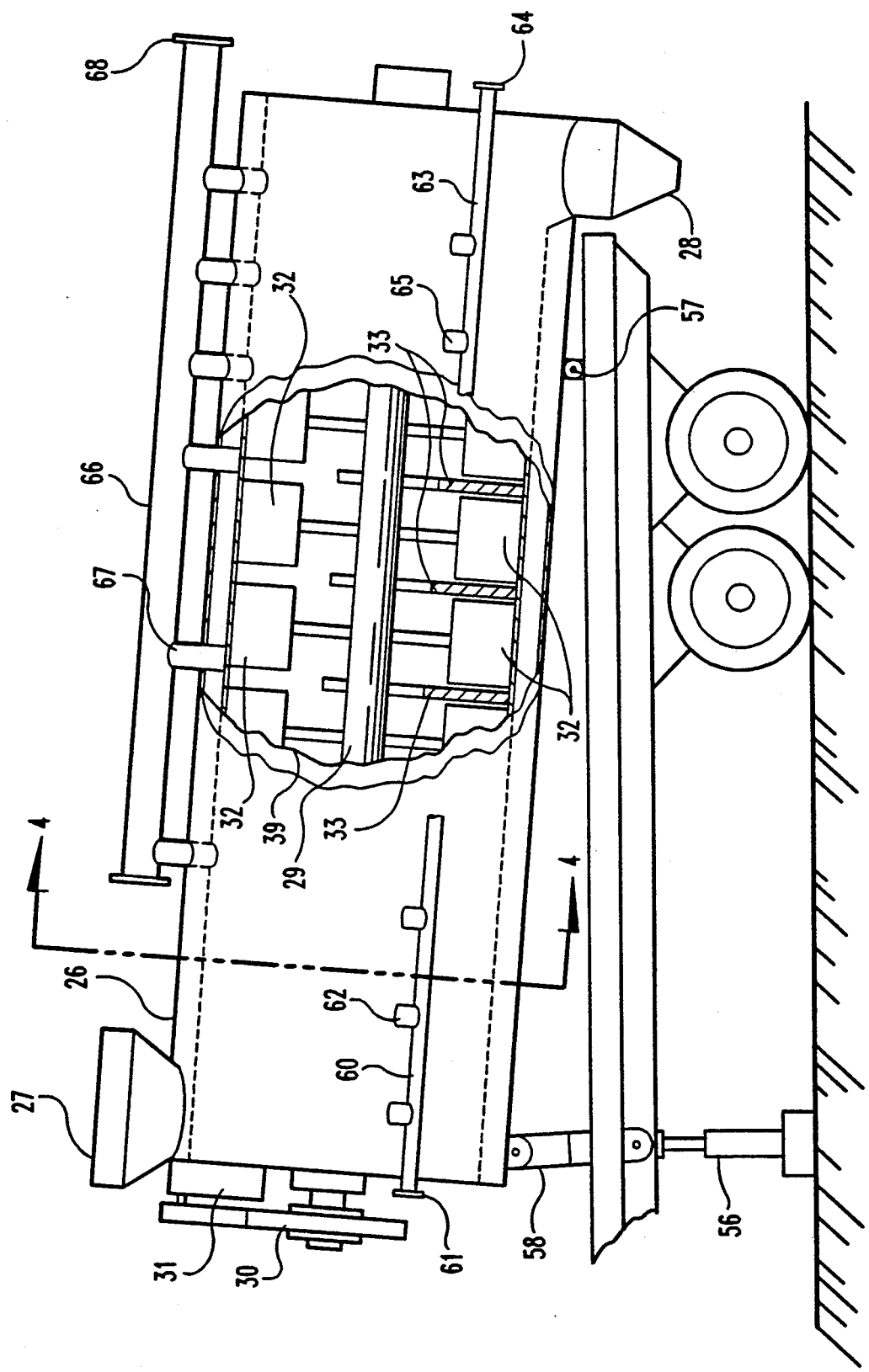
FIG. 2 is a fragmentary side view of the treatment chamber incorporating the preferred embodiment of my invention.
Figure 3:
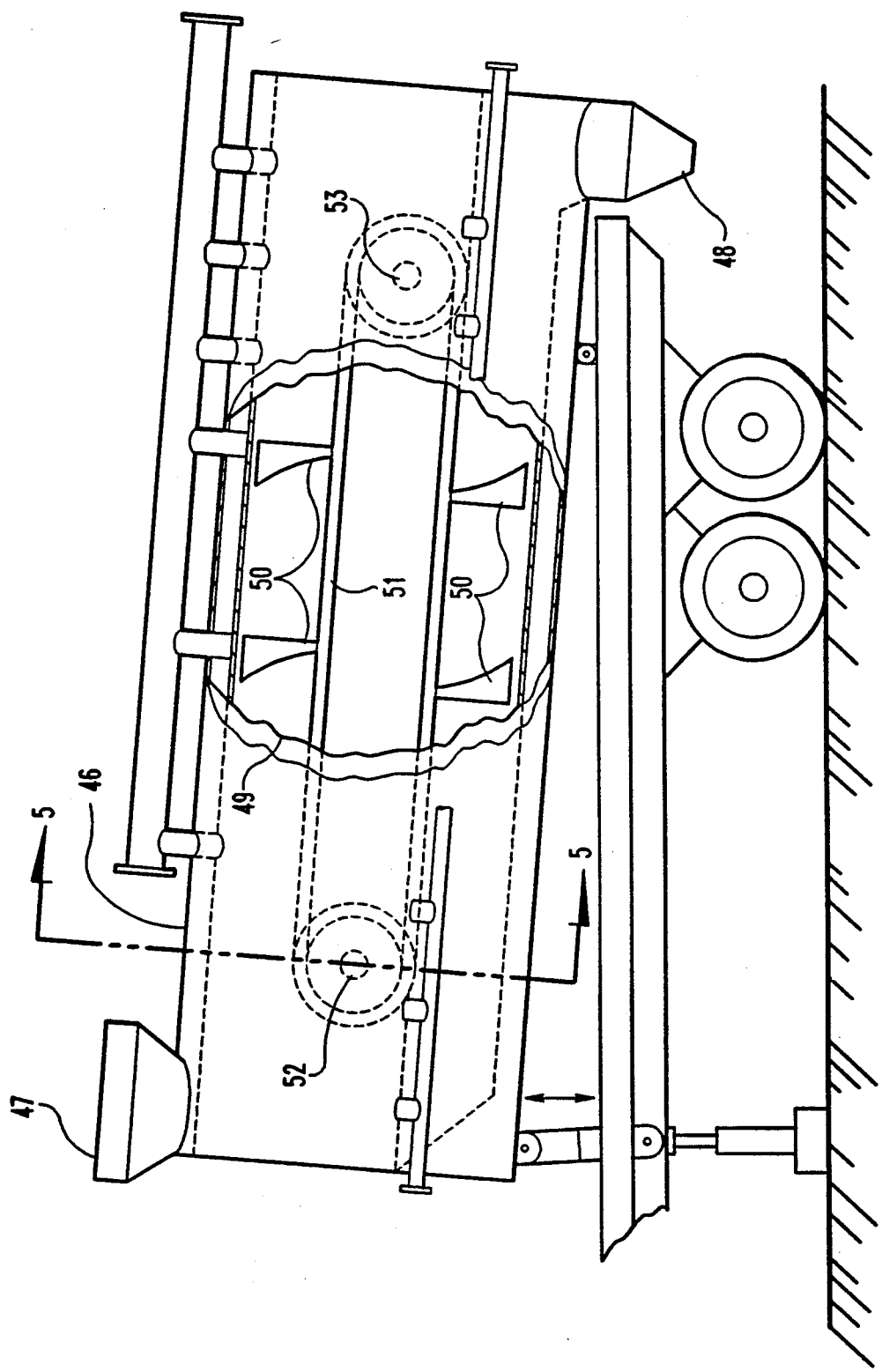
FIG. 3 is a fragmentary side view of the treatment chamber incorporating an alternate embodiment of my invention.
Figure 4:
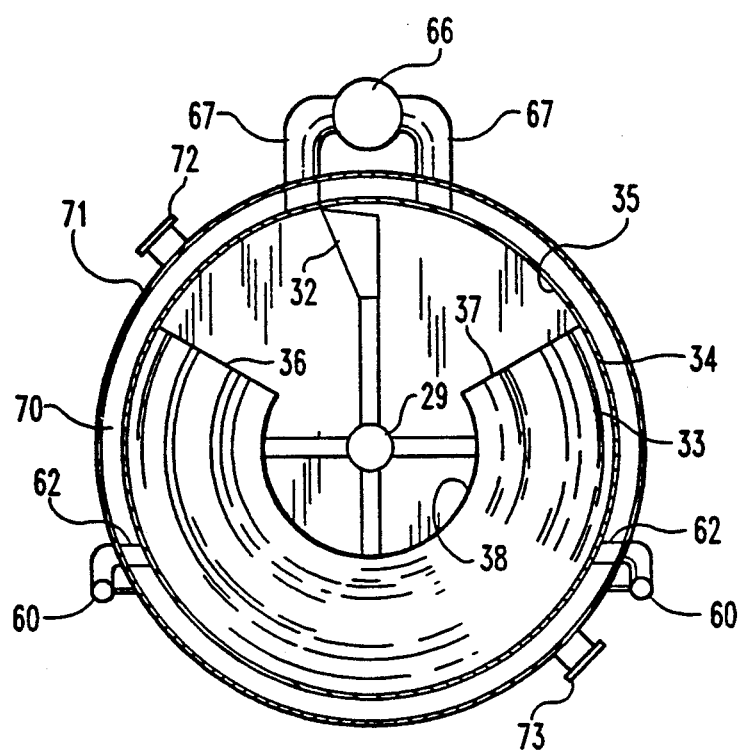
FIG. 4 is a cross sectional view taken along the line 4—4 of FIG. 2 and viewed in the direction of the arrows.
Figure 5:
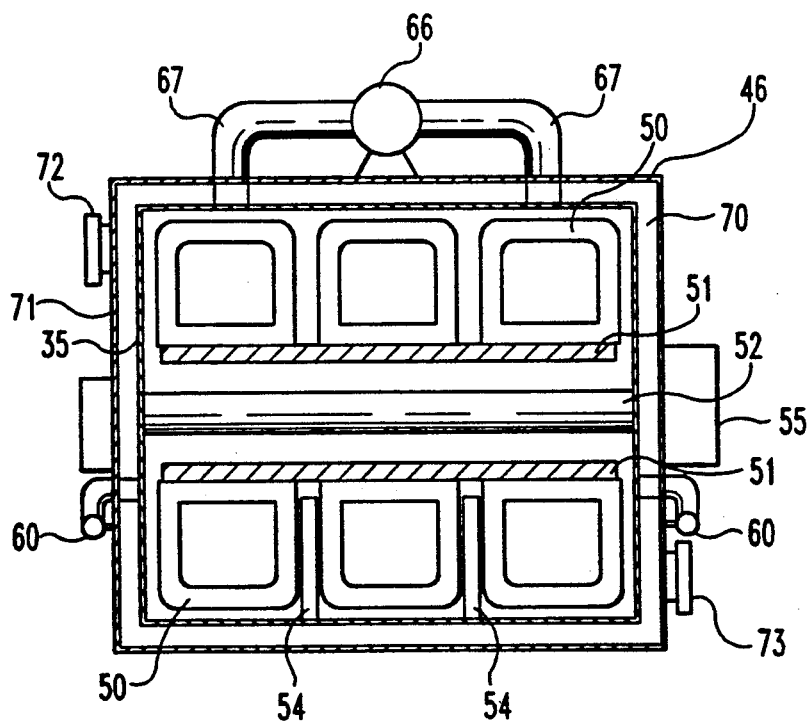
FIG. 5 is a cross sectional view taken along the line 5—5 of FIG. 3 and viewed in the direction of the arrows.

Chamber 20 may be mounted on a flatbed trailer or truck. The chamber is sealed tightly to prevent air infiltration or outward leakage of gases. The chamber can have a rectangular, square, trapezoidal, circular, or other, cross section. One embodiment of the chamber has a circular cross-section (FIGS. 2 & 4) whereas another embodiment has a rectangular or square cross-section (FIGS. 3 & 5). Chamber 20 includes a housing 26 forming a hollow interior into which the contaminated soil or material is introduced via inlet 27 located at one end of the chamber. An outlet 28 located at the opposite end of the chamber allows the treated soil or material to exit the interior. The interior wall of the chamber is relatively smooth allowing scraping with a plough, automatic shovel, or other type of scraper in order to allow cleaning of the chamber.

Housing 26 is fragmented at location 39 to illustrate the rotating rakes and fixedly mounted fins. Axle 29 is rotatably mounted to the opposite ends of housing 26 and is rotatably driven by a conventional sprocket drive 30 in turn driven by motor 31 mounted to the housing. A plurality of rakes 32 are cantileveredly mounted to axle 29 and are movable between a plurality of fins 33 mounted to the interior wall of the housing. Fins extend laterally across the length of the housing and each have an outside edge portion 34 (FIG. 4) fixedly secured to the interior wall 35 of the housing. Fins 33 have opposite ends 36 and 37 and extend approximately 270 degrees around axle 29 although it is understood the fins can extend through an angle greater than or less than 270 degrees. The interior edge portion 38 of each fin is spaced apart from axle 29 preventing interference therebetween. The contaminated soil as it moves from inlet 27 to outlet 28 flows over opposite ends 36 and 37 as well as interior edge portion 38 as axle 29 rotates and moves rakes 32 between the spaced apart fins 33.

Fins 33 partition the floor of the chamber into "channels". The fins 33 extend either lengthwise as shown in the embodiment of FIGS. 3 & 5 (which will be termed axial or axially) or crosswise as shown in FIGS. 2 & 4 (termed hereafter as radial or radially). The fins provide added heat transfer area for improved treatment characteristics and keep the solids from accumulating in piles that may escape mixing. The fins can be continuous or they may have gaps and holes in them to facilitate solids mixing and gas flow. It is desirable that the fins extend to or above the level of the solid surface although this is not an essential factor. The fins can have a variety of cross sectional shapes consistent with ease and cost of fabrication.

Many types of solid materials, most notably high-clay soils, will cake onto the hot surfaces. Caking is prevented by a series of scrapers or rakes 32 which are moved through the channels formed by the fins. The shape of the scraper blades will depend on the type of solid being treated. For example, a solid prone to caking may require a knife-blade design which cuts the caked-on solid from the wall and fins. A sandy material may require a rake or plough design. A high-organic soil may require a design which kneads the solids much like a dough-hook.

The rakes' functions are to agitate the solid, scrape cakes from the wall, break up clumps of solids and move the soil down the chamber. The shape of the blades and the type and amount of movement of the blades that is required for breaking up clumps may be different than that required for moving the soil. The disparity can be overcome by combining different types of blades in the same set of rakes or by moving the rake back and forth. The procedure will vary, depending on the type of soil and on the residence time required to remove a given contaminant. FIGS. 2 and 4 show the rakes mounted on a shaft running axially in the chamber. In this case, the rakes rotate around the chamber scraping the walls, agitating and moving the solids. The rakes in this case will tend to move the solids up. The solids will drop down and move down the chamber because of its tilt. The movement and agitation is analogous to that in a rotating kiln. If the rakes are mounted in linear system, similar to that shown in FIGS. 3 and 5, then the solids will be moved along by the movement of the rake. In both cases, solids movement and agitation can be augmented by blowing steam or non-condensible gas into the material.

Housing 46 (FIG. 3 & 5) is identical to housing 26 except that axle 29 along with rakes 32 and fins 33 have been replaced by a plurality of upstanding rakes 50 fixedly mounted to a continuous member 51 mounted to a pair of spaced apart rollers 52 and 53 rotatably mounted to and within the chamber. Housing 46 includes an inlet 47 and outlet 48. Further, housing 46 has a rectangular interior cross-section as compared to the circular cross-section of housing 26. At least one of the rollers 52 or 53 is rotatably driven by a conventional electric motor 55. Housing 46 includes a plurality of upstanding fins 54 fixedly mounted to the bottom wall of the housing and extending in the direction of the length of the housing. The rakes 50 are movable between the fins. The housing is fragmented at area 49 to illustrate rakes 50.

FIGS. 2 and 3 show the chamber mounted on a flatbed trailer or on the back of a truck. A plurality of wheels are rotatably mounted beneath the bed toward the rear portion of the bed whereas a downwardly extendable conventional support 56 is located toward the front portion of the bed to support the bed in a resting horizontal position. The chamber is pivotally mounted by bracket 57 located atop and at the rear portion of the bed. An upwardly extendable linkage means 58 is mounted to the bed at the forward portion of the bed in order to allow the operator to adjust the pitch of the chamber thereby to vary the solids residence time. The linkage may take many forms. For example, the linkage 58 may have a top end pivotally mounted to the bottom of the chamber with the linkage bottom end swingable downwardly to catch and lock in an upwardly facing mount secured to the top of the bed. Any other type of means 58 of varying the pitch can be used such as a rack and pinion, adjustable screw, etc. Changing the slope of pitch of the chamber allows solids residence time to be controlled independently of agitation. The chamber can be operated in a horizontal (level) position but will usually be operated at an incline to facilitate the movement of solids.

Sweep gases (small amounts of non-condensible gas and superheated steam) are fed to the chamber at one or more points and off-gases are removed from the chamber at one or more points in the process. A fraction of the sweep gases can be recycled back into the chamber to reduce the total volume of gas that must be condensed although this is not necessary. The preferred flow for the sweep gases is generally perpendicular or lateral to the flow of the solids.

The ability to operate in a cross-current mode is a unique feature of this invention. Cross-current gas flow reduces re-contamination of cleaned materials and allows operation at far lower gas velocities than the co- or countercurrent types of operation that are necessary with existing types of thermal treatment equipment. Lower gas velocities reduce the rate of particulate entrainment.

The treated solids are discharged at the opposite end of the chamber from the inlet system. They are allowed to cool and set up after which they may be used as fill or sent to a disposal facility.

One possible configuration for the non-condensible gas and superheated steam injection ports is shown in FIGS. 2-5. A plurality of first tubes 60 are fixedly mounted to the opposite side walls of housing 26 and include an inlet 61 and a plurality of outlets 62. Inlet 61 is in fluid communication with a source of non-condensible gas with the outlets 62 leading into the interior of the chamber. Likewise, a second plurality of tubes 63 are fixedly mounted to the exterior of the housing and include an inlet 64 in fluid communication with a source of superheated steam and a plurality of outlets 65 leading into the interior of the chamber. The precise configuration of these ports is not essential to the general operation of the invention; however, it desirable that the outlets 62 and 65 extend into the hollow chamber interior from the opposite side walls of the chamber. It is desirable that the gas and superheated steam be blown or forced into the solids being treated in order to mix them well. In general, it is desirable that the non-condensible gases be injected at the front end of the system and the superheated steam in the downstream end. Tubes identical to tubes 60 and 63 are provided on housing 46.

Steam injection typically occurs at the point in the process when the moisture present in the incoming solids has been substantially evaporated or reacted with the binder. It is essential to the operation of the process that the steam be injected at a temperature above its dew point. To illustrate, if the process is operated at substantially atmospheric pressure, then the steam temperature must be above 100° C. Typical operating temperatures for the steam are 100°-300° C. although higher temperatures may be used for special applications.

The steam, inert gases and vapors from the chamber are collected by a manifold system 66 mounted at the top of the chamber. Manifold 66 includes a plurality of inlets 67 leading into the interior of the chamber with the outlet 68 connected to condensor 21 (FIG. 1). The manifold system can be configured in many different ways in addition to that shown in FIGS. 2 through 5.

The floor and/or walls and/or ceiling (termed herein "the walls") of the chamber are heated. The heat can be supplied by any commonly used procedures. FIGS. 4 and 5 show the chamber surrounded by an annular space 70 located between inner wall 35 and outer wall 71 suitable for hot combustion gases or for low-pressure heat transfer fluid applications introduced via inlet 72 and exiting via outlet 73. This is merely one embodiment of the invention shown here for illustration. Other possible method may be:

1. Electrical heating by attaching resistance or other types of electric heaters to the walls or by incorporating them in the wall's construction.

2. Incorporate pipes, tubes, or ducts into the walls' construction or attaching such pipes, tubes or ducts to the walls. The pipes, tubes or ducts carry hot combustion gases or hot heat transfer fluids from a combustor, electrical heater or other type of heating device and heat the walls accordingly. Any other method of heating the walls to achieve the desired temperature and which keeps non-condensible gases from the solids and gases in the chamber can be used as well.

The chamber temperature varies along its length and vertically. At the solids inlet end, the walls are kept relatively cool, at a temperature of between 100° and 200° C. if no binder is used or below 100° C. if binder is being used to react chemically with the water present. The temperature must be sufficient to drive off water present on the soil. The boiling water will also "steam strip" many of the organic contaminants from the solids. If binder is used, then the heat of hydration of the binder will also cause the solids' temperature to rise.

The wall temperature increases with the downstream (in the direction of solids movement) distance and decreases upward. The upward drop in temperature will normally occur because of heat losses to the surroundings from the upper walls and ceiling of the contactor but may be encouraged by proper application of heat and/or cooling.

Temperature control can be accomplished by adjusting electrical heaters, or by varying the flow of hot combustion gases or heat transfer fluids through the ducts or pipes. The temperature variation can also be achieved by feeding hot combustion gases or heat transfer fluid at different temperatures to different portions of the walls.

The vertical temperature gradient contributes to the removal of volatile organics in the system since it creates a thermal diffusion gradient away from the solids towards the cooler gases. Any material which is released from the solid will migrate towards the cooler areas and not be redeposited on the solids. These temperature gradients from a series of temperature zones and strata.

If the gases are cooled below their dew point anywhere in the process, provisions must be made for capturing condensed liquids. Such internal condensation is generally not needed but it may prove desirable at times to minimize the size of the air pollution control equipment and ducts.

While the solids are being heated, they are purged with a gas. Superheated steam is the purge gas of choice for the system. It can be produced by either releasing pressurized steam into the contactor and allowing it to expand into the hot chamber or by injecting it under pressure through nozzles. Nozzles are desirable to force the steam into the solid mass. The nozzles can also be aimed to agitate the solids and to move them through the chamber. Different nozzles can be pointed in different directions in the chamber to facilitate these functions.

The steam is generally not introduced into the contactor at the point of solids entry. The incoming, relatively cold solid feed will need to dry and react with the binder first. The vaporizing water from the feed will provide adequate purging of the soil. In addition, a small amount of heated air or hot clean combustion gases (from the combustion of virgin fuel or non-hazardous waste), if available, may be blown into the soil at this point to help dry the solids. This small amount of non-condensible gas is necessary to prevent the formation of a vacuum at the condenser outlet as discussed below.

The normal operation pressure are at, slightly above, or slightly below atmospheric, with the major pressure differences determined by gas flow requirements and the pressure drop needs of the air pollution control devices.

Once the bulk of the water in the solids has vaporized, or reacted with the binder (the point is identified as that at which the solid's temperature exceeds 100° C., or the boiling point of the water present if the pressure is substantially different from atmospheric or if other factors change its boiling point) superheated steam is introduced into the system as the purge gas and the solids are heated while being purged with the steam.

The temperature to which the solids will be heated will depend on the types of contaminants. Volatile contaminants may only require temperatures on the order of 100° to 150° C. although temperatures above 400° C. can be achieved by increasing the size of the heat transfer area, the solids residence time, or the temperature of the surfaces and of the steam.

The steam nozzles are attached to a common source of steam or to several sources of steam. Valves and process controls are incorporated in the lines feeding steam to each nozzle and to banks of nozzles to control solids flow rate, gas flow rate, temperature, pressure and other processing conditions. In addition a fraction of the collected steam can be recycled back into the process to provide additional purge gas without increasing the volume of gas that will need to be condensed and treated.

The off-gas from the chamber, consisting of steam and controlled amounts of non-condensible gases with particulate and volatile contaminants entrained, is then cooled and condensed by direct means (water injection) and/or indirect means (non-contact heat exchanger). Because the carrier gas is almost completely condensible, the volumetric flow rate and velocity of the remaining gases will be far smaller than that for systems using a non-condensible purge gas. If added purge gas is desired, it is possible to divert a fraction of the off-gas, prior to cooling, back into the chamber. This enables the operator to increase purge-gas velocities without increasing heating and cooling requirements and the volume of condensed liquid requiring treatment.

The vast majority of entrained particulate and desorbed contaminants is trapped in the condensed water which can be filtered and treated by appropriate commercially available methods. Alternatively, the condensed water can be sent off-site for treatment and disposal.

The remaining gas stream consists of the non-condensible gas introduced into the first section of the chamber and any other non-condensible gases which may have entered the system. The temperature of the gas leaving the condenser will determine the amount of non-condensible gas being fed. It is necessary that the amount of inert gas present in the exit stream be sufficient that condensation of the water not form a vacuum at the condenser outlet greater than the system is designed to handle.

A fan, blower, ejector or other gas moving device will usually be incorporated into the design to move the remaining gas stream through the air pollution control equipment and maintain the pressure differential through the system. It may, at times, be possible to eliminate the fan by keeping the inert gas flow low enough that the pressure differential created between the heated and condensing steam would drive the gas flow. This is an operationally difficult procedure but it is theoretically not impossible.

The gas leaving the condenser has a very low volume and velocity, consisting of the small amount of water-vapor remaining and of the non-condensible gases which enter the system. It can readily be controlled by air pollution control devices such as (but not limited to) chilled water condenser, cryogenic condenser, adsorber, scrubber, electrostatic precipitator and/or fabric filter. The air pollution control equipment will be far smaller than that required for systems using a non-condensible purge gas.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method of removing organic chemical contaminants from materials including soils, solids or sludges comprising the steps of:
    directing said materials into a housing having walls forming a sealed chamber with a front portion with an inlet and a rear portion with an outlet and a longitudinal axis extending therebetween;
    adding binders to said materials concurrently or prior to said directing step;
    agitating said materials within said chamber;
    moving said materials from said inlet to said outlet;
    heating said walls to indirectly heat said materials within said chamber to vaporize organic chemical contaminants contained in said materials;
    directing superheated steam into said chamber; and,
    disposing of contaminants from said chamber.

2. A method of removing organic chemical contaminants from materials including soils, solids or sludges comprising the steps of:
    directing said materials into a housing having walls forming a sealed chambe with a front portion with an inlet and a rear portion with an outlet and a longitudinal axis extending therebetween;
    agitating said materials with a movable agitator within said chamber while holding said chamber stationary;
    moving said materials from said inlet to said outlet;
    heating said walls to indirectly heat said materials within said chamber to vaporize organic chemical contaminants contained in said materials;
    directing gas into said chamber to carry out of said chamber contaminants vaporized from heating of said materials during said heating step;
    disposing of said gas and contaminants from said chamber;
    directing said gas in a direction lateral to said longitudinal axis;
    directing non-condensible gas into said chamber at said front portion; and directing superheated steam into said chamber at said rear portion.

3. The method of claim 2 and comprising the further step of:

tilting said housing to assist movement of materials from said inlet to said outlet.

4. A method of removing organic chemical contaminants from materials including soils, solids or sludges comprising the steps of:

directing said materials into a housing having walls forming a sealed chamber with a front portion with an inlet and a rear portion with an outlet and a longitudinal axis extending therebetween;

agitating said materials with a movable agitator within said chamber while holding said chamber stationary;

moving said materials from said inlet to said outlet;

heating said walls to indirectly heat said materials within said chamber to vaporize organic chemical contaminants contained in said materials;

directing gas into said chamber to carry out of said chamber contaminants vaporized from heating of said materials during said heating step;

disposing of said gas and contaminants from said chamber;

contacting said materials with internally projecting fins mounted to said walls which transfer heat from said walls to said materials; and, adding binders to said materials concurrently or prior to the step of directing said materials into said housing.

5. The method of claim 4 and comprising the further step of:

moving a plurality of rakes past said fins to move said materials therefrom.

* * * * *

UNITED STATES PATENT AND TRADEMARK OFFICE
CERTIFICATE OF CORRECTION

PATENT NO. : 5,200,033
DATED : April 6, 1993
INVENTOR(S) : Leo Weitzman

It is certified that error appears in the above-identified patent and that said Letters Patent is hereby corrected as shown below:

Column 12, line 50 change the word "chambe" to read --chamber--.

Signed and Sealed this

Thirtieth Day of November, 1993

Attest:

BRUCE LEHMAN

Attesting Officer

Commissioner of Patents and Trademarks